(12) United States Patent
Eubanks et al.

(10) Patent No.: US 7,458,198 B2
(45) Date of Patent: Dec. 2, 2008

(54) CROP PROCESSING ROLL WITH AGGRESSIVE LEADING EDGE FOR AN AGRICULTURAL IMPLEMENT

(75) Inventors: Jason Chad Eubanks, Hedrick, IA (US); Allan Wesley Rosenbalm, Blakesburg, IA (US); Roger William Frimml, Ottumwa, IA (US)

(73) Assignee: Deere & Company, Moline, IL (US)

(*) Notice: Subject to any disclaimer, the term of this patent is extended or adjusted under 35 U.S.C. 154(b) by 51 days.

(21) Appl. No.: 11/633,827

(22) Filed: Dec. 5, 2006

(65) Prior Publication Data

US 2008/0127623 A1 Jun. 5, 2008

(51) Int. Cl.
*A01D 61/00* (2006.01)

(52) U.S. Cl. .................................. 56/16.4 R

(58) Field of Classification Search ............. 56/16.4 A, 56/16.4 C, 16.4 B, DIG. 1, 51; 241/236; 100/176

See application file for complete search history.

(56) References Cited

U.S. PATENT DOCUMENTS

| | | | | |
|---|---|---|---|---|
| 1,219,927 | A * | 3/1917 | Dibbets | 100/176 |
| 2,966,022 | A * | 12/1960 | Getz | 56/1 |
| 2,992,523 | A * | 7/1961 | Oppel | 56/1 |
| 3,732,670 | A * | 5/1973 | Milliken et al. | 56/16.4 C |
| 4,150,524 | A * | 4/1979 | Sawyer | 56/1 |
| 5,056,302 | A * | 10/1991 | Rosenbalm et al. | 56/10.3 |
| 5,419,106 | A * | 5/1995 | Gemelli | 56/16.4 B |
| 5,722,222 | A * | 3/1998 | Walters et al. | 56/6 |
| 6,499,283 | B1 * | 12/2002 | Cook | 56/16.4 B |
| 6,904,741 | B2 * | 6/2005 | Priepke | 56/16.4 C |
| 7,021,038 | B2 * | 4/2006 | Priepke | 56/16.4 C |

* cited by examiner

*Primary Examiner*—Árpád Fábián-Kovács

(57) ABSTRACT

An agricultural implement includes a frame, and a pair of crop processing rolls carried by the frame and defining a nip therebetween. At least one of the crop processing rolls includes an outer surface with a plurality of cleats. Each cleat has a leading edge with an undercut.

20 Claims, 3 Drawing Sheets

CROP PROCESSING ROLL WITH AGGRESSIVE LEADING EDGE FOR AN AGRICULTURAL IMPLEMENT

FIELD OF THE INVENTION

The present invention relates to agricultural implements such as windrowers and mower-conditioners, and, more particularly, to conditioning rolls in such implements.

BACKGROUND OF THE INVENTION

Agricultural implements such as crop harvesting implements in the form of windrowers and pull-type mower-conditioners may use a rotary or sickle-type cutterbar to sever the crop from the ground. The crop is typically conveyed over the cutterbar and up the platform deck, and through a conditioner to be processed to facilitate crop drying, with the crop leaving the conditioner and engaging forming shields so that the crop forms a windrow or swath on the ground.

Conditioners generally breach the stem structure of the crop so that the sun and air can work to dry down the crop faster than if the stem structure remains intact and retains the moisture within the stem. Conditioners of known design include impeller conditioners, angled steel conditioners and roll conditioners. A roll conditioner includes a pair of opposed conditioning rolls, typically generally vertically oriented to each other and defining a nip therebetween. The crop passes in a rearward direction through the nip and is crimped by the opposed conditioning roll.

Conditioning rolls usually include an outer surface with cleats which assist in feeding the crop material through the conditioner. The cleats are known as lugs (also called flutes) when outwardly extending, and grooves when inwardly extending. Under certain operating conditions, the cleats may not be aggressive enough to effectively feed the crop through the conditioner evenly.

What is needed in the art is a roll conditioner with opposed crop processing rolls which evenly and reliably feed crop material through the conditioner under all crop conditions.

SUMMARY OF THE INVENTION

The invention comprises, in one form thereof, an agricultural implement, including a frame, and a pair of crop processing rolls carried by the frame and defining a nip therebetween. At least one of the crop processing rolls includes an outer surface with a plurality of cleats. Each cleat has a leading edge with an undercut.

The invention comprises, in another form thereof, a crop processing roll for use in an agricultural implement. The crop processing roll includes an outer surface with a plurality of cleats. Each cleat has a leading edge with an undercut.

BRIEF DESCRIPTION OF THE DRAWINGS

FIG. 3 is a fragmentary, sectional, end view of another embodiment of a crop processing roll of the present invention;

DETAILED DESCRIPTION OF THE INVENTION

Figure 1:
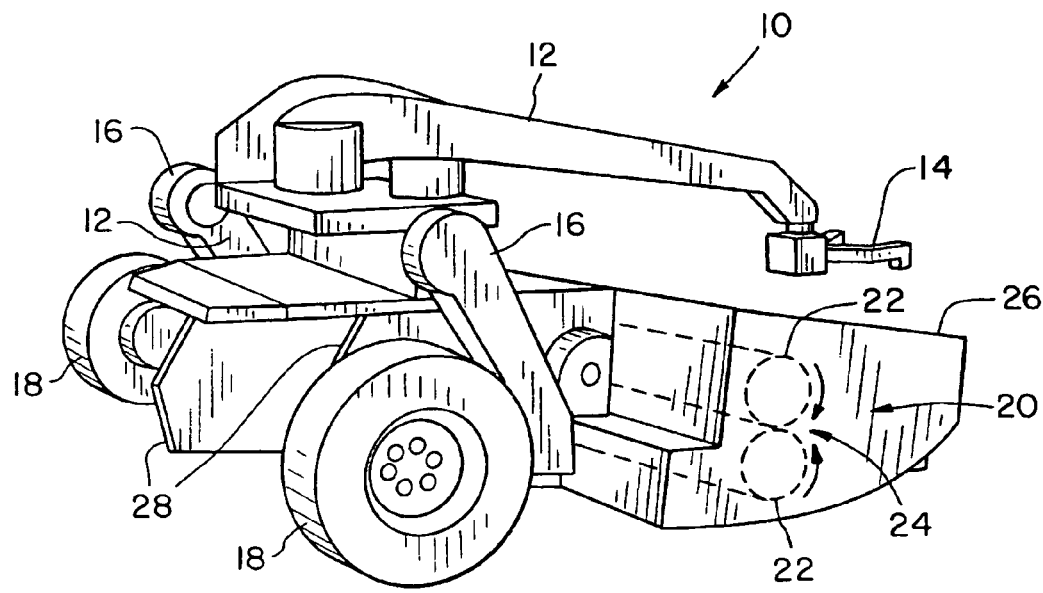
FIG. 1 a perspective view of a mower-conditioner including an embodiment of a pair of crop processing rolls of the present invention.
Figure 2:
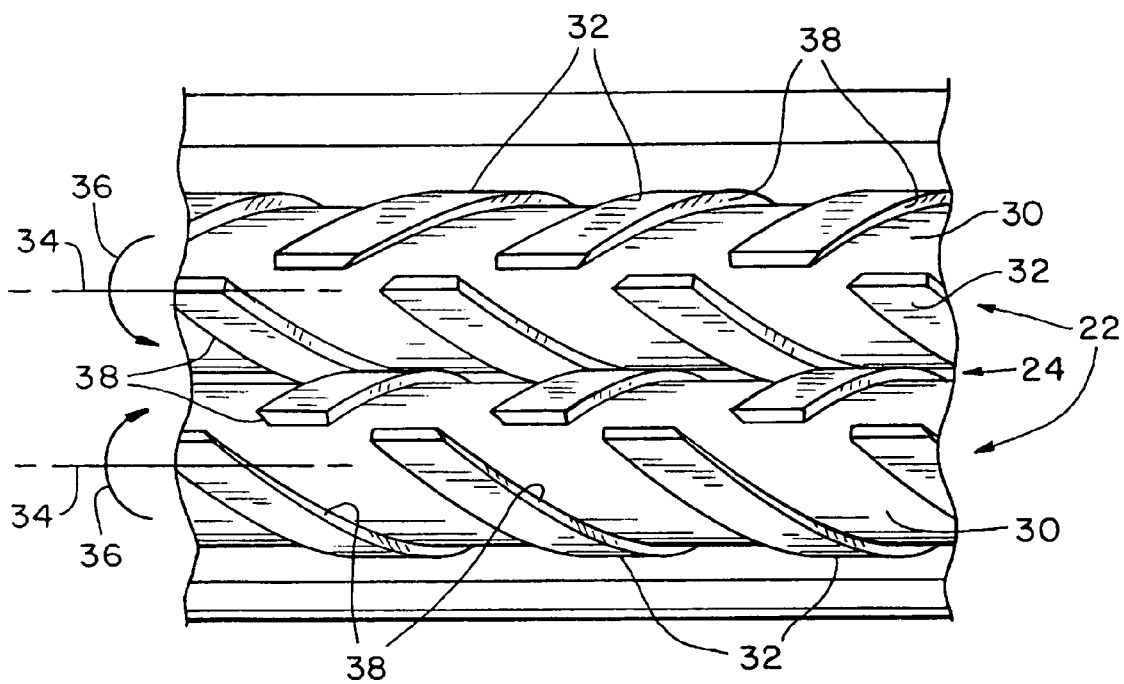
FIG. 2 is a fragmentary, plan view of the crop processing rolls used in the mower-conditioner of FIG. 1.
Figure 3:
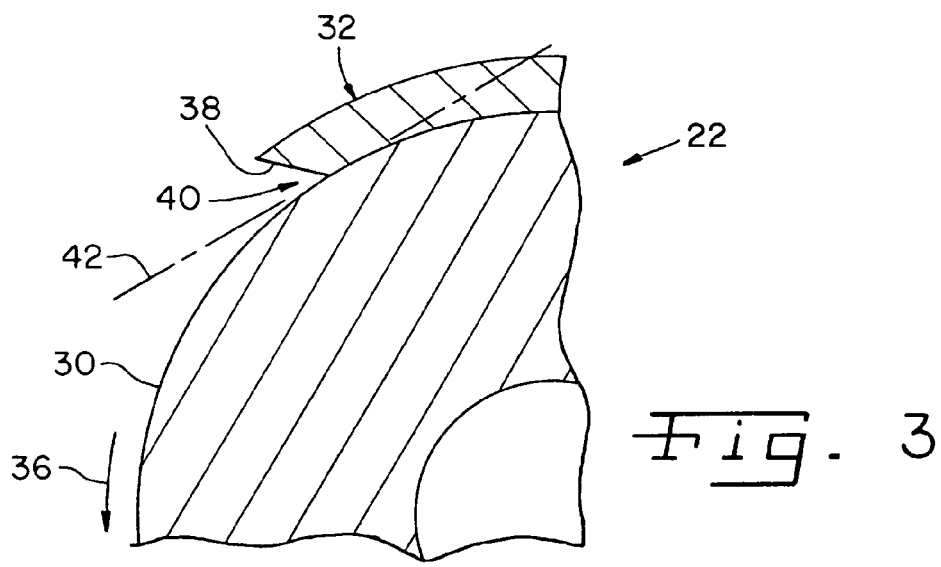
FIG. 3 is a fragmentary, sectional, end view of one of the crop processing rolls shown in FIGS. 1 and 2.

Referring now to the drawings, and more particularly to FIGS. 1-3, there is shown an agricultural implement in the form of a mower-conditioner 10. Although shown as a mower-conditioner 10, the implement may also be configured, e.g., as a windrower, peanut harvester or silage chopper. Mower-conditioner 10 generally includes a frame 12 which is coupled with a source of tractive and power take-off (PTO) power, such as an agricultural tractor, through hitch 14. Frame 12 includes pivotable lift arms 16 which are coupled with a pair of wheels 18, respectively. The operating height of mower-conditioner 10 is adjusted by moving lift arms 16, such as with a pair of parallel connected hydraulic cylinders.

Frame 12 also carries a conditioner 20 including a pair of substantially identically configured crop processing rolls 22 which are generally vertically oriented relative to each other and define a nip 24 therebetween through which crop material passes. Conditioner 20 is positioned within a shroud 26, which also enshrouds a rotary or sickle-type cutterbar (not shown). The crop material is cut by the cutterbar, transported through nip 24 between crop processing rolls 22, and discharged to the field through forming shields 28. The horizontal width between forming shields 28 may be adjusted to vary the width of the windrow of crop material.

In the embodiment shown, each crop processing roll 22 is in the form of a conditioning roll within mower-conditioner 10. However, it is also possible that the one or more crop processing rolls may be part of another type of agricultural implement. For example, a crop processing roll configured according to the present invention may be part of a peanut harvester or a feed roll within a silage chopper (not shown). Further, each crop processing roll 22 is assumed to be substantially identically configured, and therefore only one of crop processing rolls 22 will be described in further detail hereinafter. It is also possible to configure conditioner 20 with crop processing rolls 22 which are not substantially identical.

Each crop processing roll 22 includes an outer surface 30 with a plurality of cleats 32. Cleats 32 are oriented at an acute angle relative a longitudinal axis 34 of each crop processing roll 22 so as to assist in moving the crop material through nip 24. To that end, depending upon a direction of rotation 36 of a corresponding crop processing roll 22, and the angular orientation of a corresponding cleat 32, each cleat 32 has a leading edge 38 which engages the crop material and assists in transporting the crop material through nip 24.

According to an aspect of the present invention, each cleat 32 has a leading edge 38 which is aggressively configured with an undercut 40 which assists in transporting the crop material through nip 24. In the embodiment illustrated in FIGS. 2 and 3, each cleat 32 has an undercut 40 which extends substantially across the full face of leading edge 38. Undercut 40 defined by leading edge 38 is oriented at less than a 90° angle relative to a line 42 drawn tangent to outer surface 30 at a radially inner intersection with leading edge 38.

Each cleat 32 is formed from an elastomeric material, such as urethane or rubber, which is adhesively bonded to outer surface 30 of crop processing roll 22. Outer surface 30 is also assumed to be formed from the same type of elastomeric material, and thus it is possible to integrally form cleats 32 with outer surface 30 by removing a portion of outer surface 30 using a suitable manufacturing process. Further, it is possible to manufacture outer surface 30 and cleats 32 from a different type of material. For example, it is possible to form cleats 32 and/or outer surface 30 from steel.

Figure 4:
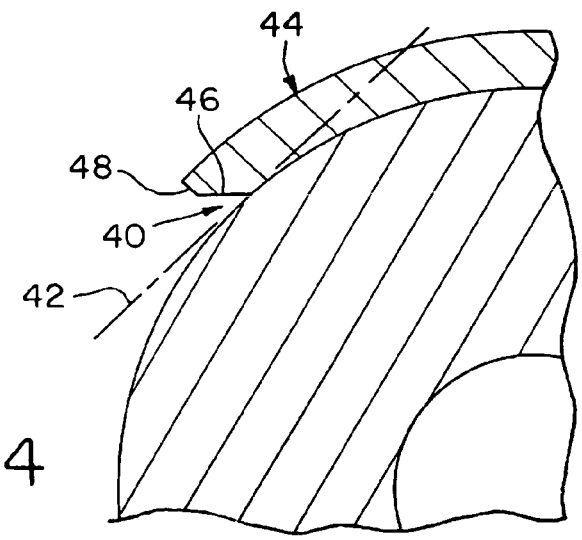
FIG. 4 is a fragmentary, sectional, end view of another embodiment of a crop processing roll of the present invention.

Cleats 32 are defined herein as corresponding to outwardly extending lugs (as shown in FIGS. 2 and 3) or inwardly extending grooves (not specifically shown). Regardless, cleats in the form of outwardly extending lugs or inwardly extending grooves have a leading edge with an undercut for assisting in movement of the crop material through nip 24. FIGS. 4-7 illustrate other embodiments of cleats having an undercut at the leading edge thereof for assisting in movement of the crop material through the nip between adjacent crop processing rolls. In FIG. 4, a cleat 44 has a leading edge 46 with an orthogonal portion 48 oriented approximately perpendicular to tangent line 42. Orthogonal portion 48 is located at a radially outer portion of leading edge 46, and undercut 40 is located at a radially inner portion of leading edge 46.

Figure 5:
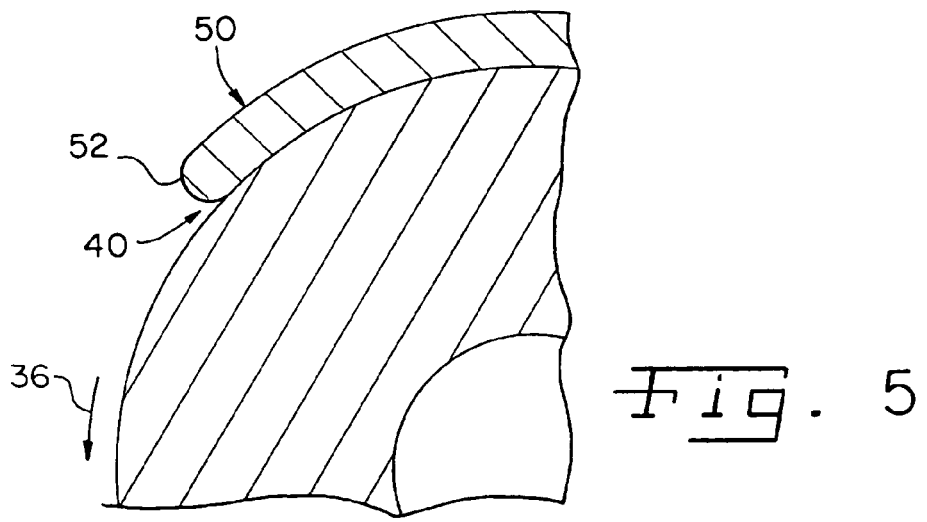
FIG. 5 is a fragmentary, sectional, end view of another embodiment of a crop processing roll of the present invention.

In the embodiment shown in FIG. 5, a cleat 50 includes a rounded leading edge 52 with an undercut 40 at the radially inner portion thereof.

Figure 6:
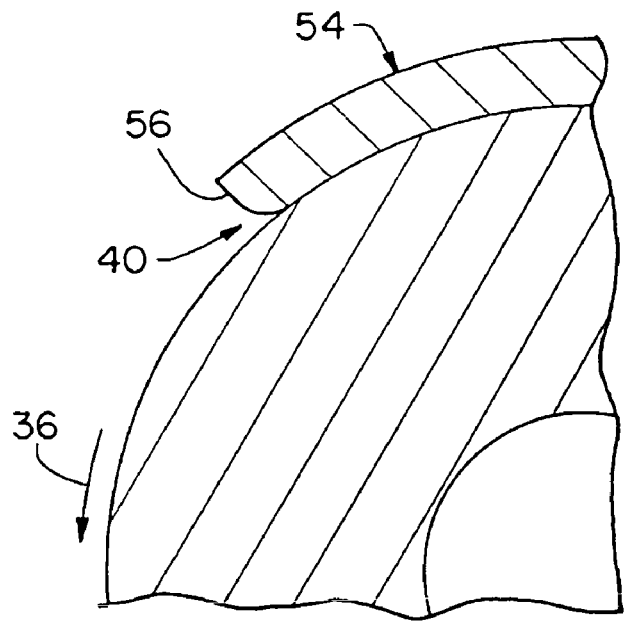
FIG. 6 is a fragmentary, sectional, end view of another embodiment of a crop processing roll of the present invention.

In FIG. 6, a cleat 54 includes an orthogonal portion 56 at a radially outer portion thereof, and a rounded surface defining undercut 40 at a radially inner portion thereof.

Figure 7:
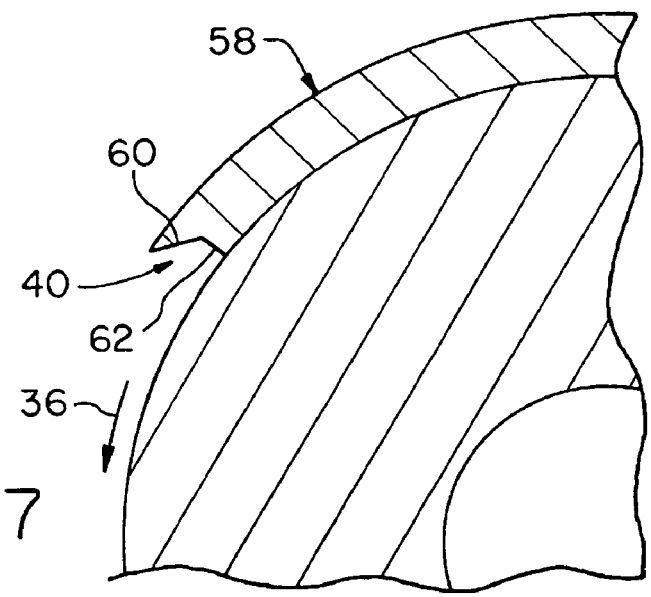
FIG. 7 is a fragmentary, sectional, end view of another embodiment of a crop processing roll of the present invention.

In FIG. 7, a cleat 58 includes a leading edge 60 with an orthogonal portion 62 located at a radially inner portion thereof. Undercut 40 is defined by the radially outer portion of leading edge 60.

During operation of mower-conditioner 10, crop processing rolls 22 rotate toward nip 24 to feed the crop material through conditioner 20 to forming shields 28. Each cleat has an aggressive leading edge with an undercut 40 that assists in movement of the crop material through nip 24, and ensures a more even flow of crop material through conditioner 20.

Having described the preferred embodiment, it will become apparent that various modifications can be made without departing from the scope of the invention as defined in the accompanying claims.

The invention claimed is:

1. An agricultural implement, comprising:
   a frame; and
   a pair of crop processing rolls carried by said frame and defining a nip therebetween, at least one said crop processing roll including an outer surface with a plurality of cleats, at least one said cleat having a leading edge with an undercut, said undercut being oriented at less than 90 degrees to a line drawn tangent to said outer surface at an intersection with said leading edge and wherein said leading edge includes an orthogonal portion oriented approximately perpendicular to said tangent line.

2. The agricultural implement of claim 1, wherein said orthogonal portion is located at a radially outer portion of said leading edge.

3. The agricultural implement of claim 1, wherein said orthogonal portion is located at a radially inner portion of said leading edge.

4. The agricultural implement of claim 1, wherein said undercut is located at a radially outer portion of said leading edge.

5. The agricultural implement of claim 1, wherein said undercut is located at a radially inner portion of said leading edge.

6. The agricultural implement of claim 1, wherein said undercut extends across substantially all of said leading edge.

7. The agricultural implement of claim 1, wherein said cleats include one of outwardly extending lugs and inwardly extending grooves.

8. The agricultural implement of claim 1, wherein said crop processing rolls are comprised of at least one of an elastomeric material and steel.

9. The agricultural implement of claim 8, wherein said crop processing rolls are comprised of one of urethane and rubber.

10. The agricultural implement of claim 1, wherein each said cleat has a leading edge with an undercut.

11. A crop processing roll for use in an agricultural implement, said crop processing roll comprising an outer surface with a plurality of cleats, at least one said cleat having a leading edge with an undercut, said undercut being oriented at less than 90 degrees to a line drawn tangent to said outer surface at an intersection with said leading edge and wherein said leading edge includes an orthogonal portion oriented approximately perpendicular to said tangent line.

12. The crop processing roll of claim 11, wherein said orthogonal portion is located at a radially outer portion of said leading edge.

13. The crop processing roll of claim 11, wherein said orthogonal portion is located at a radially inner portion of said leading edge.

14. The crop processing roll of claim 11, wherein said undercut is located at a radially outer portion of said leading edge.

15. The crop processing roll of claim 11, wherein said undercut is located at a radially inner portion of said leading edge.

16. The crop processing roll of claim 11, wherein said undercut extends across substantially all of said leading edge.

17. The crop processing roll of claim 11, wherein said cleats include one of outwardly extending lugs and inwardly extending grooves.

18. The crop processing roll of claim 11, wherein said crop processing roll is comprised of at least one of an elastomeric material and steel.

19. The crop processing roll of claim 18, wherein said crop processing roll is comprised of one of urethane and rubber.

20. The crop processing roll of claim 11, wherein each said cleat has a leading edge with an undercut.

* * * * *